United States Patent
Altheimer et al.

[11] Patent Number: 5,854,669
[45] Date of Patent: Dec. 29, 1998

[54] SERIES OF LENSES

[75] Inventors: Helmut Altheimer; Norbert Awrath, both of Munich; Rudolf Barth, Vierkirchen; Peter Baumbach, Munich; Jochen Brosig, Gruenwald; Gregor Esser, Haar; Monika Fuess, Munich; Guenther Guilino, Munich; Walter Haimerl, Munich; Christine Meixner, Munich; Herbert Pfeiffer, Munich; Manfred Rohrbach, Hebertshausen, all of Germany

[73] Assignee: Optische Werke G. Rodenstock, Munich, Germany

[21] Appl. No.: 553,499

[22] PCT Filed: Mar. 30, 1995

[86] PCT No.: PCT/DE95/00438

§ 371 Date: Mar. 21, 1996

§ 102(e) Date: Mar. 21, 1996

[87] PCT Pub. No.: WO95/27229

PCT Pub. Date: Oct. 12, 1995

[30] Foreign Application Priority Data

Mar. 30, 1994 [DE] Germany .................... 44 11 157.6
Oct. 29, 1994 [DE] Germany .................... 44 38 506.4

[51] Int. Cl.$^6$ .................................................. G02C 7/06
[52] U.S. Cl. ............................................................ 351/169
[58] Field of Search ...................... 351/168, 169, 351/170, 171, 172

[56] References Cited

U.S. PATENT DOCUMENTS 2,878,721  3/1959  Kanolt ...................... 351/169

FOREIGN PATENT DOCUMENTS 0039497  11/1981  European Pat. Off. .
0295849  12/1988  European Pat. Off. .
0384128  8/1990  European Pat. Off. .

*Primary Examiner*—Scott J. Sugarman
*Attorney, Agent, or Firm*—Evenson, McKeown, Edwards & Lenahan P.L.L.C.

[57] ABSTRACT

The present description refers to a series of progressive lenses, wherein the lenses present a different surface power in the distance-vision part and/or a different increase of the surface power from the distance-vision part towards the near-vision part (termed addition Add hereinafter), and whereof each

- comprises a front surface having a continuously varying surface power which increases from the respective value BK [dpt], which is suitable for distance vision, at the point having the coordinates x=0 mm, y=8 mm in the lower region of the distance-vision part along a wound line (primary line), which coincides approximately with the primary line of view, with eyes dropped, towards a value suitable for near vision in the upper region of the near-vision part, which value is greater than the value of the surface power BK in the lower region of the distance-vision part by the value ADD [dpt] of the addition, and
- having a surface, in particular the surface on the concave side, which has a spherical shape or an aspherical shape, respectively.

The present invention is characterized by the aspects that for the maximum height y of the line on which the surface astigmatism is 0.5 dpt and which defines the lower limit of the region suitable for clear vision on either side of the primary line at a distance of 25 mm, applies:

$$y = f(Add, BK) = b(BK) + a/Add \cdot 1000$$

$$b(BK) = a_0 + a_1 \cdot BK + a_2 \cdot BK^2$$

and that for the coefficients on the nose side and the temporal side of the primary line applies:

|   | nose side | | temporal side | |
|---|---|---|---|---|
| a | $-8.5 \pm 20\%$ | | $-7.5 \pm 20\%$ | |
| $a_0$ | 18...19 | mm | 19...20 | mm |
| $a_1$ | $-3580 \pm 29\%$ | mm$^2$ | $-4520 \pm 20\%$ | mm$^2$ |
| $a_2$ | $390\,000 \pm 20\%$ | mm$^3$ | $480\,000 \pm 20\%$ | mm$^3$. |

20 Claims, 19 Drawing Sheets sph + 4.0 cxyl 1.0 A 0°
ADD 2.0 sph + 4.0 cxyl 1.0 A 0°
ADD 2.0

SERIES OF LENSES

FIELD OF THE INVENTION

The present invention relates to a series of lenses in accordance with the introductory clauses of the independent patent claims.

PRIOR ART

Lenses of the type which the introductory clauses if the independent patent claims start out from comprise (as a rule) a front surface having a continuously varying surface power (progressive surface), which power increases from the respective value suitable for distance vision BK [dpt] at a point having the coordinates x=0 mm, y=8 mm) (as chosen within the general framework of the present application) (distance-vision reference point) in a lower region of the distance-vision part along a wound line (primary line) which coincides approximately with the primary line of view, with eyes dropped, i.e. the point at which the line of sight passes through the surface having a continuously varying surface power, with eyes dropped, towards a value suitable for near vision in the upper region of the near-vision part, which is higher—at the near-vision reference point—by the value Add [dpt] of the addition than the surface power BK in the lower region of the distance-vision part. The surface on the concave side presents a spherical or aspherical configuration or, respectively, a toroidal or non-toroidal configuration in the case of an astigmatic prescription.

The designers of progressive lenses have to manufacture such progressive lenses with different values of the surface power at the distance-vision reference point and/or with different increases of the value of the surface power from the distance-vision part towards the near-vision part (referred to as addition Add hereinafter) in order to satisfy the requirements of different vision defects or the different degrees of presbyopia, respectively. Owing to the different materials (silicate glass with a refractive index of 1.525, silicate glass with a high refraction whose refractive index amounts to 1.6 or even 1.7, for instance, as well as plastic materials) and in view of a great number of base lines and additions (as a rule from 0.5 dpt to 3.5 or 4 dpt, in steps of 0.25 dpt in typical cases), a "complete range" typically demands the calculation and production of 100 different surfaces, normally, however, by far more than 100.

In the past the lenses of this type, with different surface powers in the distance-vision part and/or with different increases of the surface power from the distance-vision part to the near-vision part, had to be calculated first by computing a progressive surface having a defined surface power and a defined addition, also termed near-vision addition. Starting out from this surface then the other surfaces were calculated, in which the addition or refraction varied, respectively, and which were necessary for the series. In this respect explicit reference is made to the U.S. Pat. No. 2,878,721, inter alia, which mentions explicitly this fact. Here explicit reference is made to this patent as well as to the German Patent DE-A-28 14 936 for the explanation of all the terms not defined here in detail, such as the surface power and the surface astigmatism.

More recently, progressive surfaces have been calculated for each separate surface power at the distance-vision reference point and for each individual addition—e.g. by means of so-called spline interpolation, i.e. by a method other than the derivation of a so-called parent surface by transformation.

In these calculation approaches frequently "performance functions" are employed in which the surface properties are specified from a physiologic point of view. The "reasonable" specification of the surface properties is hence of decisive significance for the calculation.

In accordance with the present invention it has been found that excessively far-reaching demands, e.g. with respect to the size of the distance-vision part, render the optimization of other surface properties more difficult, if not entirely impossible. For a rapid and economic calculation of a plurality of progressive surfaces, the specification of surface properties as a function of the base line (surface power BK in the distance-vision part) and/or the addition is hence of decisive importance.

BRIEF DESCRIPTION OF THE INVENTION

The present invention is based on the problem of proposing dimensioning rules for the parameters which are essential from a physiologic point of view in a lens, such as the delimitation of the distance-vision part and/or the error in alignment of the primary line, by which this line follows the point at which the line of vision, with eyes dropped, passes through the progressive surface, which rules define these parameters as functions of the refraction in the distance-vision part and/or the addition at least in the form of limits, such that the calculation of individual surfaces will be possible without excessive expenditure and without a variation of the "performance" functions.

One inventive solution to this problem is defined in the independent claims. Improvements of the invention are the subject matter of the dependent claims.

In accordance with the present invention applies for the maximum height y (in mm) of the line on which the surface astigmatism is 0.5 dpt and which hence delimits the suitable area of clear vision on either side of the primary line at a distance of 25 mm:

$$y = f(\text{Add}, BK) = b(BK) + a/\text{Add} * 1000$$

$$b(BK) = a_0 + a_1 * BK + a_2 * BK^2$$

The coefficients on the nose side and the temporal side of the primary line are defined there as follows:

|  | nose side |  | temporal side |  |
|---|---|---|---|---|
| a | −8.5 ± 20% |  | −7.5 ± 20% |  |
| $a_0$ | 18...19 | mm | 19...20 |  |
| $a_1$ | −3580 ± 29% | mm$^2$ | −4520 ± 20% | mm$^2$ |
| $a_2$ | 390 000 ± 20% | mm$^3$ | 480 000 ± 20% | mm$^3$ |

It goes without saying that in that zone of the distance-vision part, which is suitable for a clear or distinct vision, the astigmatism, which is substantially determined by the surface astigmatism in the lower region of the distance-vision part, must be smaller than 0.5 dpt or else the visual acuity would be excessively reduced.

In the known lenses of the type which the introductory clause of claim 1 starts out from, a compromise is made with a view to the limitation of the lower lateral part so as to facilitate the optimization of the other parameters, e.g. the width of the near-vision part and/or the width of the progressive area—which compromises frequently determine the comfortableness of the respective progressive lens for the wearer of the glasses, and which are not required:

In fact, it has turned out that it is possible to let the "0.5 dpt line" of the surface astigmatism extend into the lower lateral zone of the distance-vision part "with a weaker gradient" than in prior art, without the necessity to compromise on the other parameters such as the width of the progression area or the width of the near-vision part. The inventive dimensioning rule furnishes a dimensioning of the maximum width of the distance-vision part, normally all over the range of action and addition, in any case, however, over the normal range, which is at the limit at which deteriorations of the lens characteristics "are just not yet" caused in other regions. The term "normal range of action" is defined to denote the area where not too great plus effects are created.

In the context of the present invention, the term "series of progressive lenses" defined in a way that it denotes a set of at least two progressive lenses which are distinguished from each other by their refraction at the distance-vision reference point or by their addition (near-vision additive). The progressive areas of lenses in such a set normally present a "topologic similarity" but even though the existence of such a topologic similarity is a preferred property of the set it is not a definite necessity for at least two lenses constituting a "set" in the sense of the present invention.

In a preferred improvement of the present invention, which is characterized in claim 2, the tolerances for the coefficients a, $a_1$ and $a_2$ are restricted to the range of +5%. Moreover, the coefficient $a_0$ on the nose side may have the value 18 whereas the coefficient on the temporal side may have the value 19.3 (claim 3). Such a selection of coefficients allows for a finer optimization of the progressive surfaces with a different base line and/or addition.

Claim 4 characterizes an improvement wherein the minimum width dx of the near-vision part, which may be achieved with an optimization at the level of the near-vision reference point is only a function of the addition Add, rather then a function of the power BK at the distance-vision reference point, which is surprising. In correspondence with the facts established hereinbefore, one starts out from the fact that the near-vision part is limited by the 0.5 dpt line of the surface astigmatism of the progressive surface.

The width of the near-vision part, almost like the width of the distance-vision part, is a significant parameter for the acceptance of a progressive lens by the respective user. A wide near-vision part, for instance, permits a survey of several columns in a newspaper, without may movement of the head.

In particular, in accordance with claim 5, applies for the minimum width dx of the near-vision part "at the level of the near-vision reference point":

$$dx = b' + a'/(Add*1000)$$

with
 a'=14.6±20%
 b'=5 ... 7 mm

In this definition the "near-vision reference point" is to be understood to denote that point on the primary line, in correspondence with the usual definition, at which the surface power of the progressive area reaches the value (BK+ADD).

For the design of the progressive area, and specifically for the configuration of the near-vision part, it is preferred here that the tolerance for the coefficient a' is ±5% while the coefficient b' has a value of 6 mm (claim 6).

In another embodiment of the present invention, which is defined in the dependent claim 7, applies for the error in alignment $x_0$ of the projection of the primary line in plane x,y:

$$x_0 = b'' + a'' - a''/(1 + e^{c*(y+d)})$$

For the coefficients the following values apply:

$2 \leq a'' \leq 4.3$ mm $-0.03 \leq b'' \leq 0$ mm $-0.4 \leq c \leq -0.3$ mm$^{-1}$ $4.5 \leq d \leq 5.1$ mm According to claim 8, the coefficient a" is a function of the addition Add and of the power BK at the distance-vision reference point.

Claim 9 establishes the fact that in the relationship given in claim 7 applies for the coefficient a":

$$a'' = \alpha*ADD + \beta*BK + \Gamma$$

wherein the following values are applicable for the coefficients in the relationship given in claim 9:

$100 \leq \beta \leq 300$ mm$^2$ for Add$\leq 2.5$ dpt:

$0 \leq \beta \leq 200$ mm$^2$ $1.3 \leq \Gamma \leq 2$ mm for Add>2.5 dpt:

$800 \leq \alpha \leq 1100$ mm$^2$ $0.7 \leq \Gamma \leq 0$ mm

In the inventive lens series it is possible that the primary line is a surface astigmatism line, even though very small. It is preferable, however, that the primary line does not present a surface astigmatism claim 10). It has actually been found in accordance with the present invention, that in opposition to the teaching of the German Patent DE 30 16 935 C2, it is possible to implement a progressive lens with a large distance-vision part and a large near-vision part, as well as also with a large progression area, and particularly when the primary line is a so-called umbilical line (at least) within the range $-18$ mm$<y \leq 12$ mm.

According to the present invention it is also preferred that the lines of equal surface power are horizontally passing over into the primary line, which is different from prior art. With this provision rocking phenomena etc. are definitely avoided for the wearer of the eyeglass in the event of a horizontal sighting movement. The horizontal passage of the lines of equal surface power into the primary line is achieved by the definition of an infinitesimal strip of a higher order on either side of the primary line; in this respect reference is made to the German Patent DE-A-43 37 369, specifically the information presented there on the calculus method.

As a result of the horizontal passage of the lines of equal surface power, a typical graph of the difference of the horizontal radii is obtained. The term "horizontal radius" is meant to denote the value of the radius which is achieved by intersection of the progressive area with a horizontal plane y=const. Hence the difference of the horizontal radii is understood to be the difference of the horizontal radius on the primary line at point $x=x_0$, $y=y_0$ from the horizontal radius at a point $x=x_1$, $y=y_1$ of the progressive area.

On account of the lines of equal surface power passing over horizontally, which is enforced in accordance with the present invention, the difference of horizontal radii is varied in the lower region of the distance-vision part, i.e. for values y between 5 and 10 mm in a strip on either side of the primary line, which has a unilateral extension of roughly 3 to 8 mm with a comparatively great gradient, whereas the variation outside this strip has a substantially smaller gradient. In the progression area and in the near-vision part, on the other hand, the gradient of the difference of horizontal radii in this strip on both sides of the primary line is comparatively small.

In progressive lenses of the general type which the introductory clauses of the independent claims start out from, the progressive area, i.e. the surface with a continuously varying surface power, constitutes, as a rule, the front face, even though this is not definitely required.

According to the present invention it has now been found that due to the configuration of the second surface, which—in correspondence with the foregoing—is normally the surface on the concave side, substantial "cosmetic advantages" may be achieved, particularly by using aspherical surfaces on the concave side.

If in the event of a spherical prescription an aspherical surface is chosen as surface on the concave side, and in the event of a non-toroidal prescription a toroidal surface, the base graph of the progressive area, i.e. the surface power at the distance-vision reference point, may be chosen to present a "flattening" by 1 dpt to 1.5 dpt, relative to a spherical surface or toroidal surface, respectively, on the concave side. In the case of a flatter base graph normally a distinct reduction of the visual acuity could be obtained, and particularly a substantial restriction of the region appropriate for "clear vision". In fact, however, the inventive selection of aspherical areas with a "flatter base graph" permits the achievement of an enlargement of the area suitable for clear and distinct vision.

It is preferable that the design of the non-toroidal surface varies as a function of the axial position of the cylinder. The term non-toroidal surface is to be understood in the sense of a surface having at least one aspherical section, i.e. a section varying from the circular shape. Claim 14 is characterized by the fact that the deviation dz between the sagitta of the aspherical section(s), on the one hand, and a circle having a radius corresponding to the apex radius of the asphere, on the other hand, is defined as follows:

$$dz = a_j * r^2 + b_j * r^4$$

wherein:

dz is the deviation (in $\mu$m) between the apex circle and the principal section, r denotes the distance from the apex (in mm), i.e. $r = (x^2 + y^2)^{0.5}$, and that for the coefficients applies:

$|a_j| \leq 2*10^{-4}$ mm$^{-1}$ $|b_j| \leq 1*10^{-6}$ mm$^{-3}$ with the principal section having the smaller curvature at the apex being defined by j=1, and with the section presenting the greater curvature at the apex being defined by j=2. Here the coefficients coefficients $a_j$ and $b_j$ may be defined by the following functional relationships:

$a_j = f_{j1}(s,z) = a_{j1}(s) + b_{j1}(s)*cyl$ $b_j = f_{j2}(s,z) = a_{j2}(s) + b_{j2}(s)*cyl$ wherein:

s denotes the spherical effect at the distance-vision reference point, cyl reflects the cylindrical effect at the distance-vision reference point, with a negative cylinder notation, and each of the coefficients $a_{j2}$ and $b_{j2}$ is a second-order function of s.

For the coefficients $a_{j1}$ and $b_{j2}$, on the other hand, may apply:

$|a_{j1}| \leq 5*10^{-5}$ mm$^{-1}$ $|b_{j1}| \leq 5*10^{-2}$ $|a_{j2}| \leq 4*10^{-7}$ mm$^{-3}$ $|b_{j2}| \leq 3*10^{-4}$ mm$^{-2}$ The coefficients $a_{j2}$ and $b_{j2}$ may be defined by the following functional relationships:

$a_{j2} = a_{j21} + b_{j21}*s + c_{j21}*s^2$ $b_{j2} = a_{j22} + b_{j22}*s + c_{j22}*s^2$ wherein one may apply for the coefficients a, b and c:

$a_{j21} = 2.35*10_{-8}$ mm$^{-3} \pm 50\%$ $b_{j21} = -1.7*10_{-5}$ mm$^{-2} \pm 50\%$ $c_{j21} = -8*10_{-8}$ mm$^{-1} \pm 50\%$

In claim 20, the coefficients of the two principal sections are defined, which permit the calculation of a non-toroidal rear surface with a progressive front face in a very simple manner.

$a_{121} = 2.35*10_{-8}$ mm$^{-3} \pm 50\%$ $b_{121} = -1.7*10_{-5}$ mm$^{-2} \pm 50\%$ $c_{121} = -8*10_{-8}$ mm$^{-1} \pm 50\%$ $a_{122} = 1.73*10_{-5}$ mm$^{-2} \pm 50\%$ $b_{122} = 3.22*10_{-2}$ mm$^{-1} \pm 50\%$ $c_{122} = -2.27 \pm 50\%$ $a_{222} = -2.76*10_{-5}$ mm$^{-2} \pm 50\%$ $b_{222} = -1.29*10_{-3}$ mm$^{-1} \pm 50\%$ $c_{222} = -0.172 \pm 50\%$

BRIEF DESCRIPTION OF THE DRAWING

The present invention will be described in more details in the following by the example of embodiments, with reference to the drawing wherein.

DESCRIPTION OF EMBODIMENTS

Figure 1A:
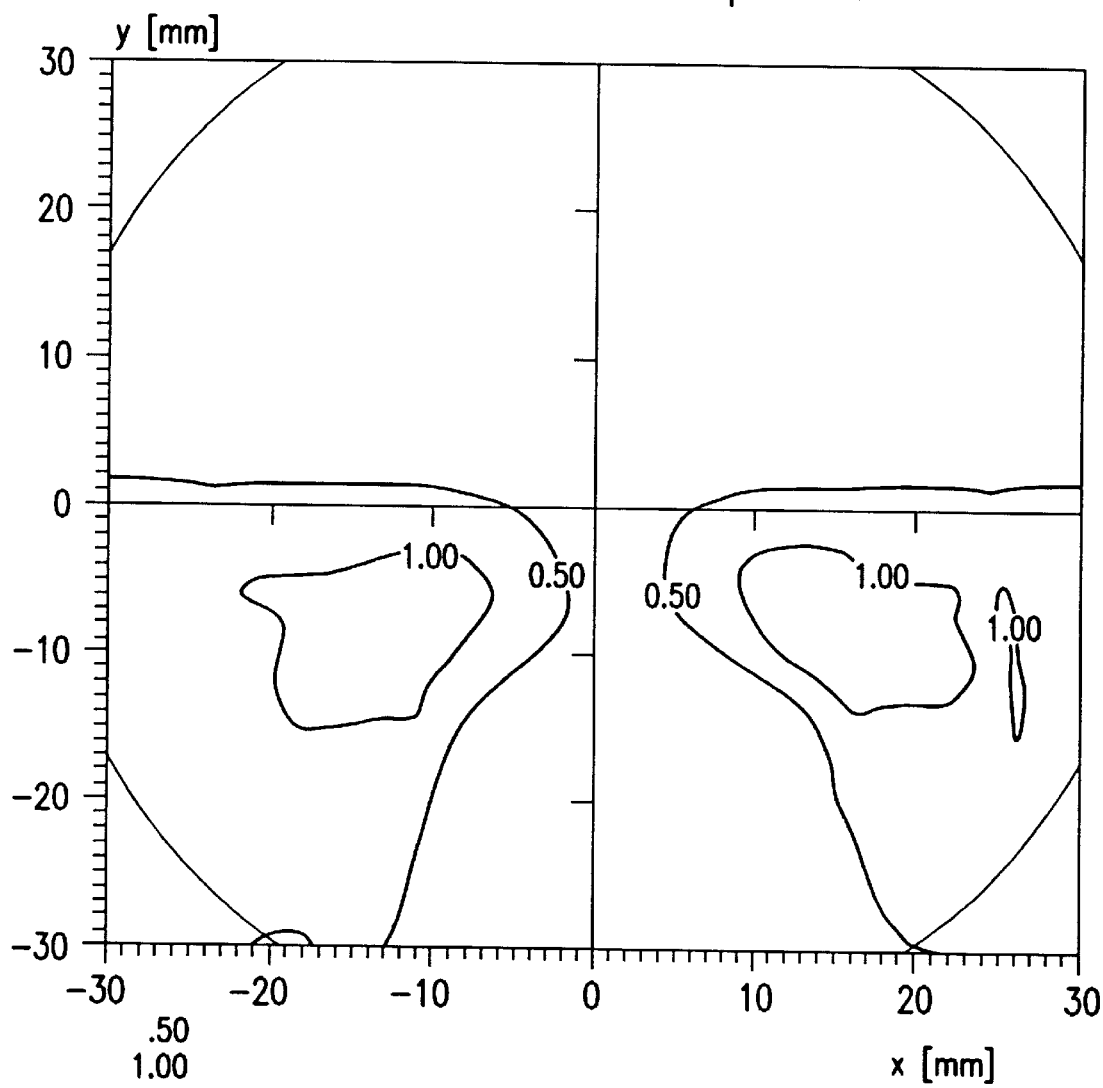
FIGS. 1a to 1c show each lines of equal surface astigmatism for lenses having a surface power of 4 dpt at the distance-vision reference point, and different additions (1 dpt to 3 dpt)
Figure 1B:
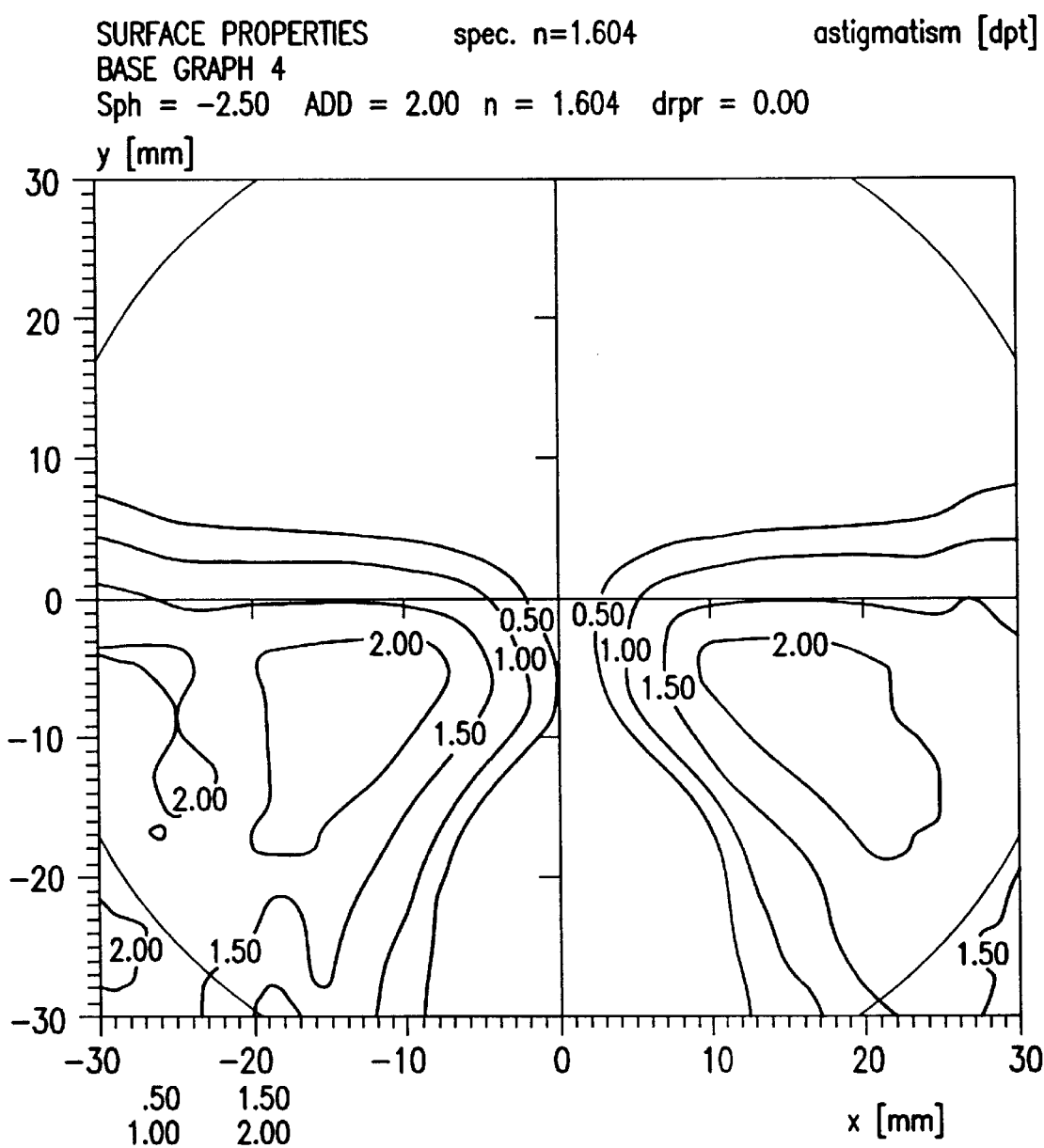
Figure 1C:
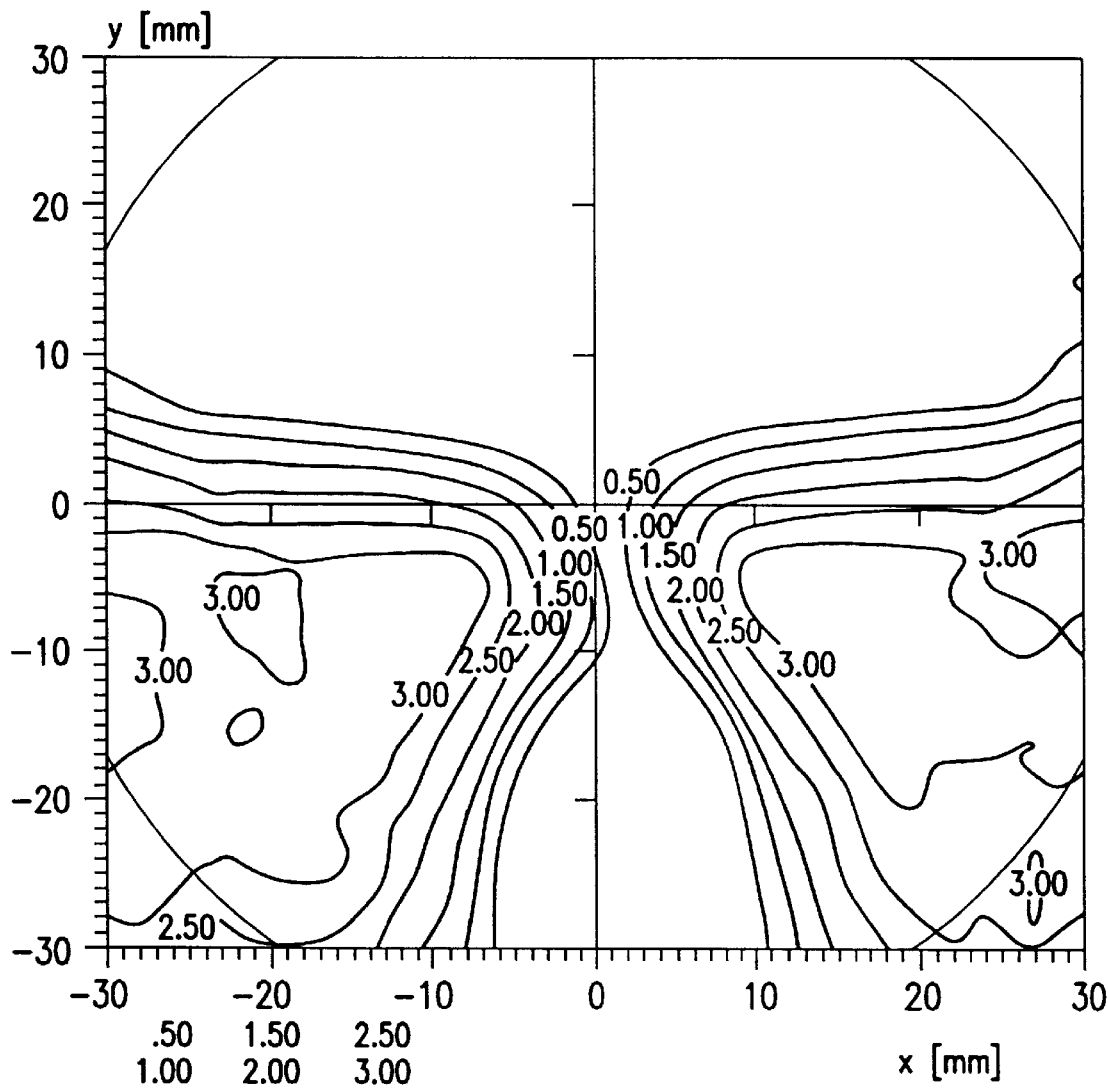
Figure 2A:
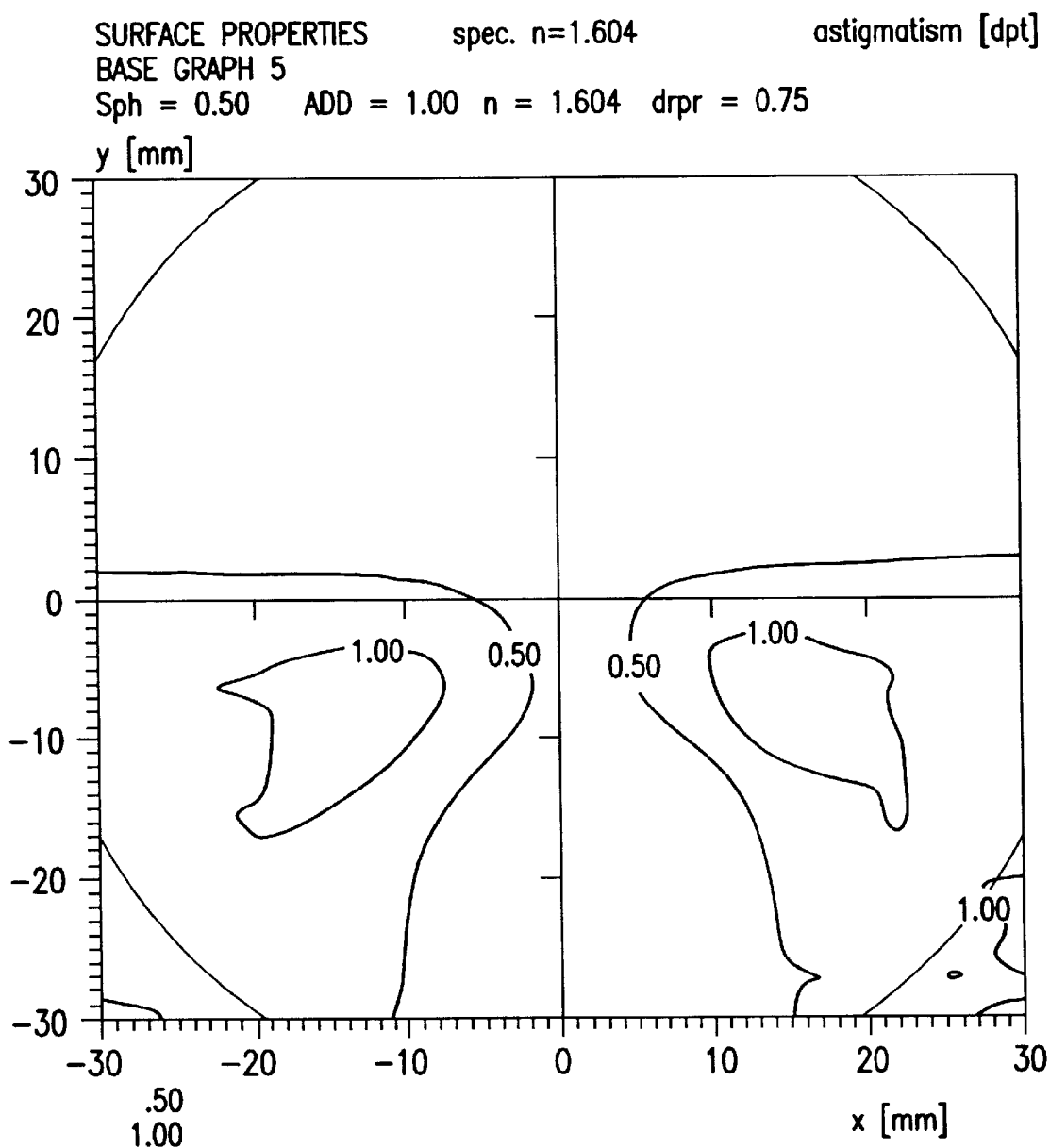
FIGS. 2a to 2c show each lines of equal surface astigmatism for lenses having a surface power of 5 dpt at the distance-vision reference point and different additions.
Figure 2B:
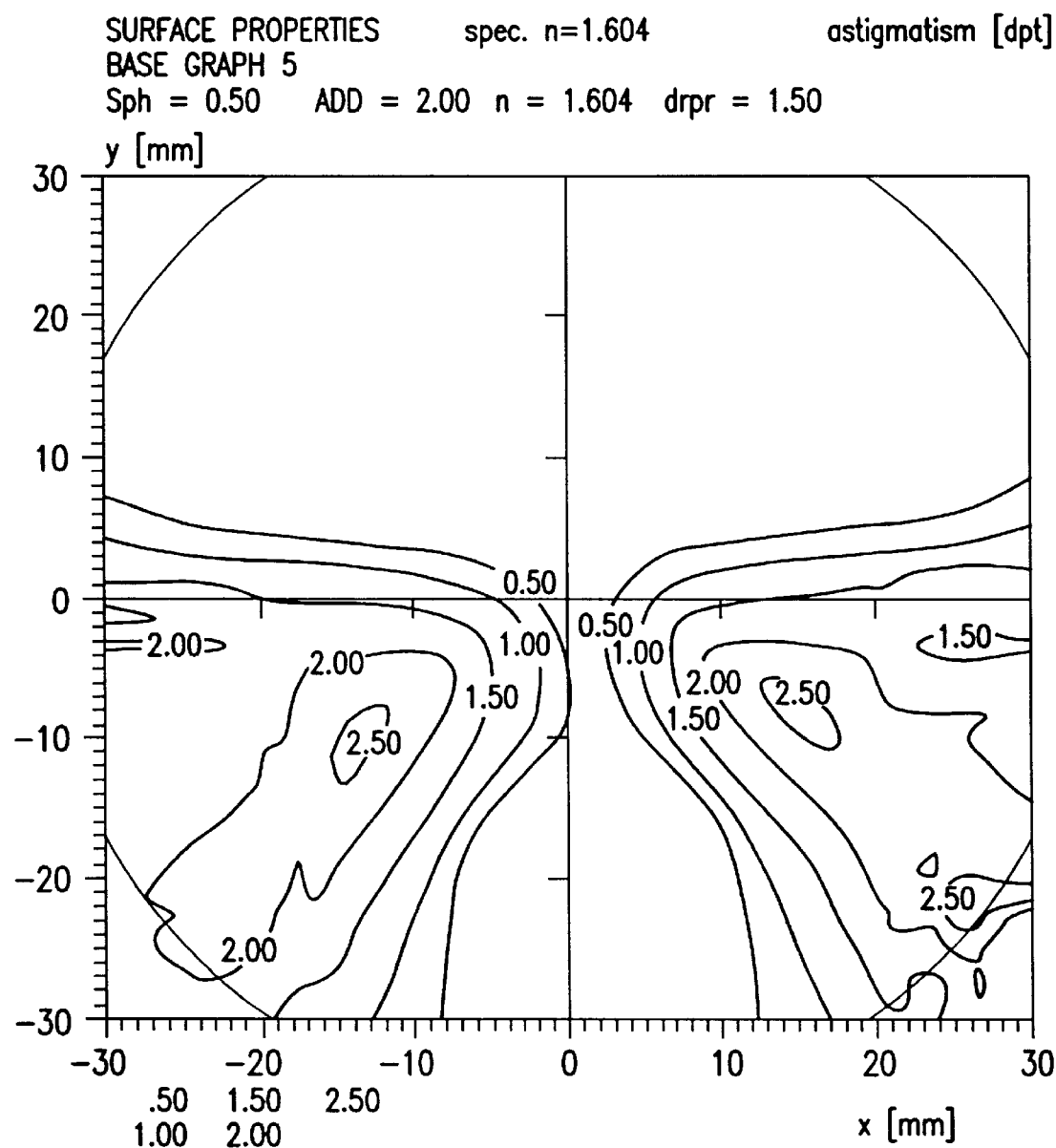
Figure 2C:
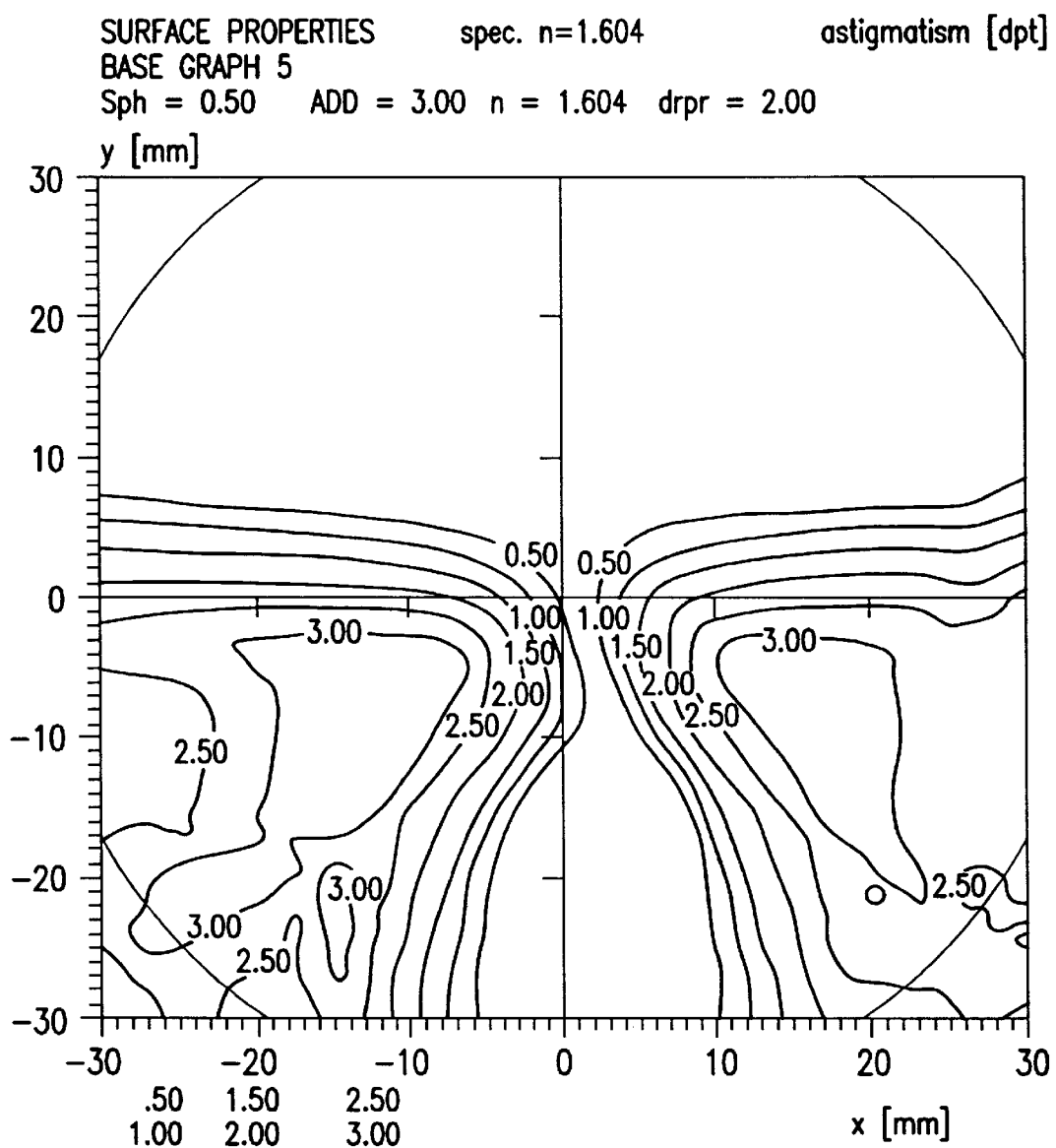
Figure 3A:
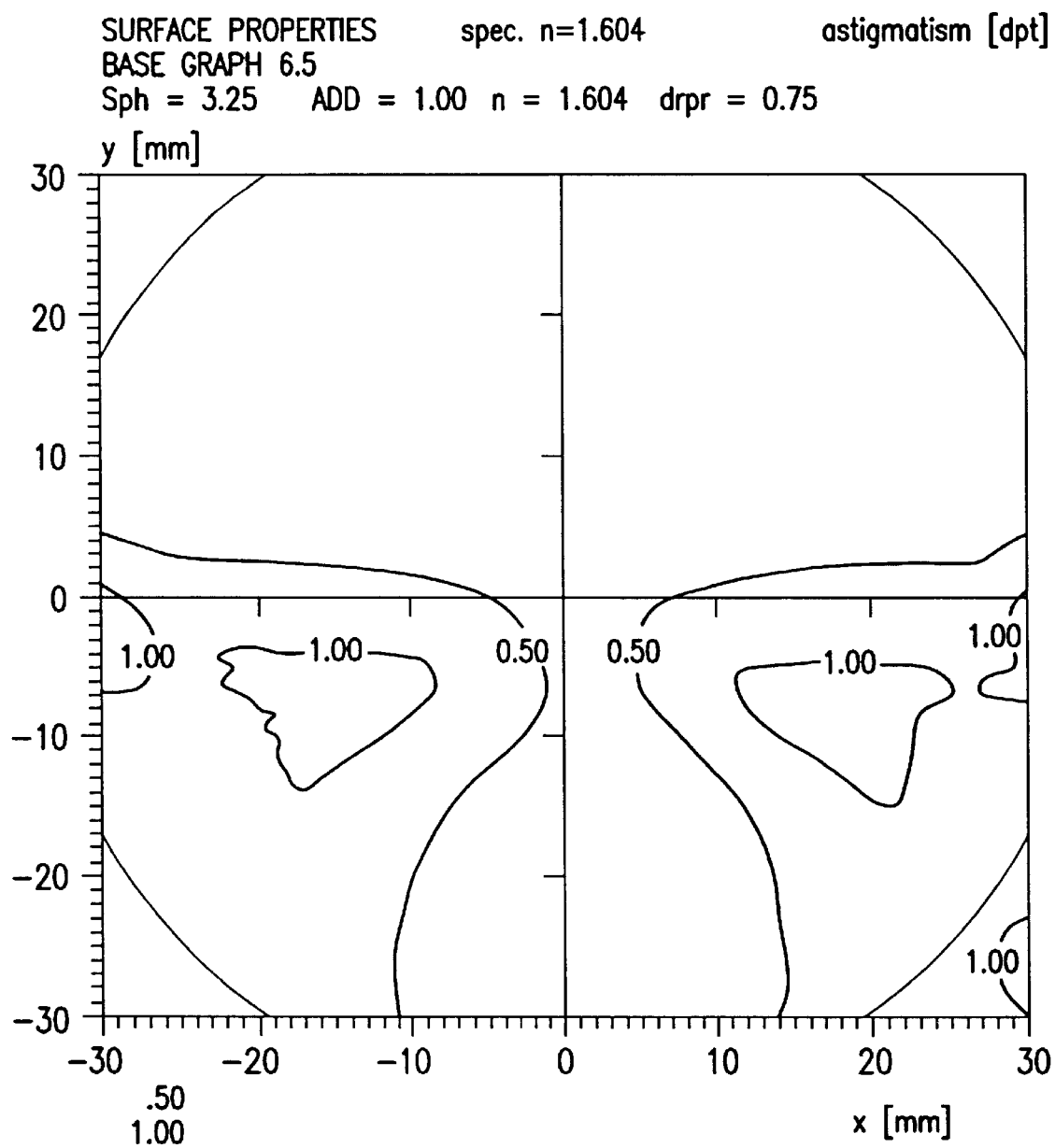
FIGS. 3a to 3c illustrate each lines of equal surface astigmatism for lenses having a surface power of 6.5 dpt at the distance-vision reference point and different additions.
Figure 3B:
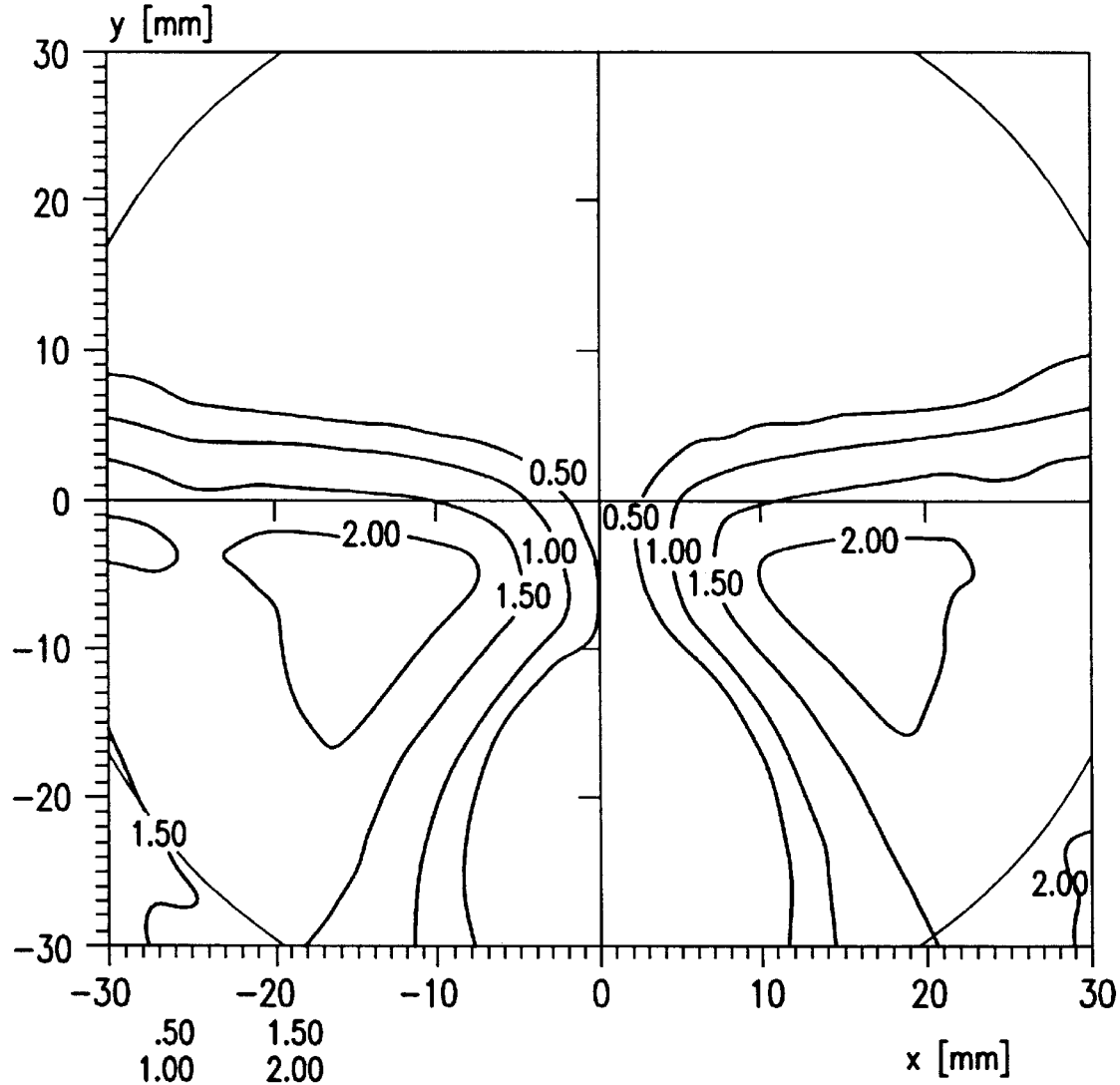
Figure 3C:
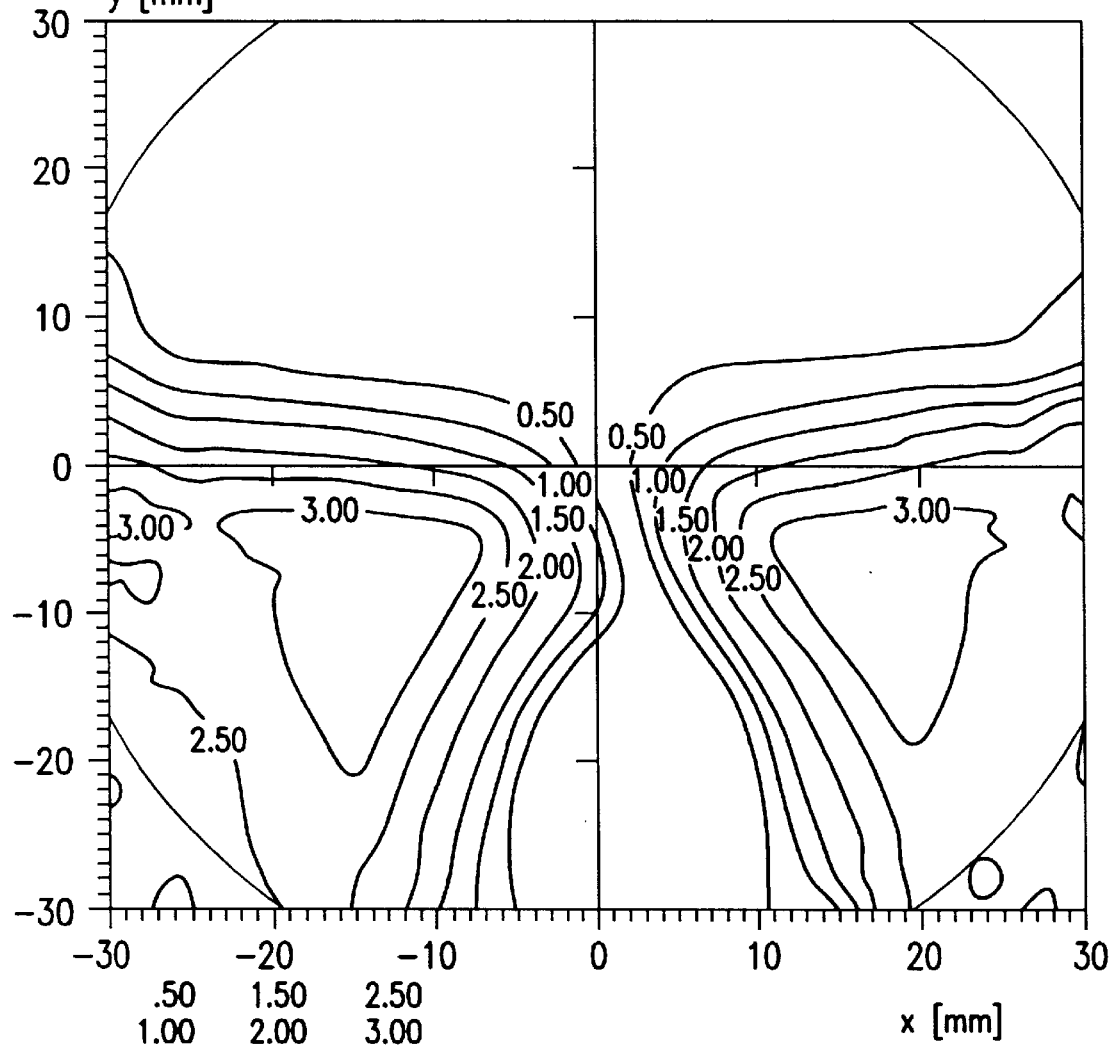

In FIGS. 1 to 3 the surface power (in dpt) is illustrated for progressive front faces designed, in accordance with the present invention, as a function of the coordinates x and y (in mm) for a field of 60*60 mm, wherein additionally the limits of a typical "round blank" of a lens are plotted.

Concerning the definition of the surface astigmatism exemplary reference is made to the U.S. Pat. No. 2,878,721.

The surfaces illustrated in the figures present each the following "basic data":

|        | BK  | n     | surf.part. | a    | b    | c    |
|--------|-----|-------|------------|------|------|------|
| FIG. 1 | 4   | 1.604 | Add        | 1dpt | 2dpt | 3dpt |
| FIG. 2 | 5   | 1.604 |            | 1    | 2    | 3    |
| FIG. 3 | 6.5 | 1.604 |            | 1    | 2    | 3    |

The value BK (in dpt) is meant to denote the so-called surface power associated with the surface at the so-called distance-vision reference point having the coordinates x=0 mm, y=8 mm. At the distance-vision reference point the lens produces an effect suitable for the respective wearer's vision in the distance. Typical spherical effects of the illustrated lenses at the distance-vision reference point may be as given below, with the surface on the concave side being a spherical face:

|        |           |
|--------|-----------|
| FIG. 1 | −2.5 dpt  |
| FIG. 2 | 0.5 dpt   |
| FIG. 3 | 3.25 dpt. |

"Add" (in dpt) denotes here the addition, i.e. the increase of the surface power from the distance-vision reference point towards the so-called near-vision reference point at which the lens produces an effect suitable for clear vision in the vicinity. As may be taken from the table given in the foregoing the additions are 1 dpt, 2 dpt and 3 dpt.

In FIGS. 1a to 3c so-called iso-astigmatism lines have been plotted for surface astigmatism values of 0.5 dpt, 1.0 dpt, 1.5 dpt, 2.0 dpt, 2.5 dpt and 3.0 dpt. The absence of iso-astigmatism lines for certain values in the individual figures means that the respective progressive area does not have regions where the surface astigmatism reaches these values. The figures clearly show the dependence of the height y of the line on which the surface astigmatism amounts to 0.5 dpt, at a spacing by 25 mm from the primary line, on the surface power at the distance-vision reference point and on the addition.

Moreover, FIGS. 1a to 3c show that the minimum width dx of the near-vision part is only a function of the addition Add, particularly at the level of the near-vision reference point (mainly) as defined in the usual manner. The function of the base graph, i.e. the surface power at the distance-vision reference point, is, by contrast, substantially smaller!

By the way, for a disclosure of all the details not explained here exhaustively explicit reference is made to the figures.

Figure 4A:
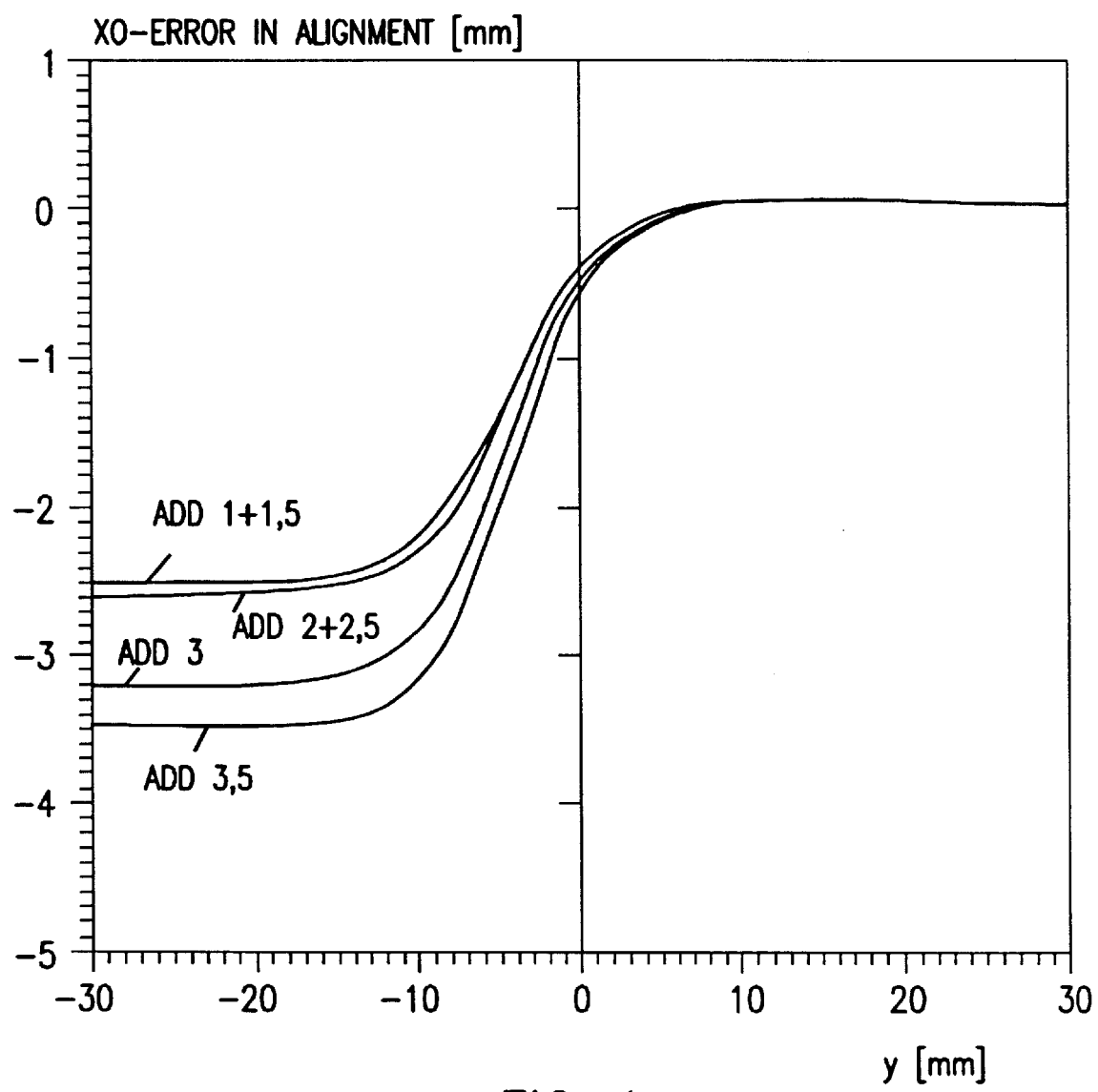
FIG. 4a reflects the projection of the primary line in the x,y plane for primary lines with different additions and a surface power of 5 dpt at the distance-vision reference point for an explanation of the so-called error in alignment $x_0$.

FIG. 4a shows the projection of the primary line in the plane x,y for primary lines having different additions, specifically 1.0 dpt, 1.5 dpt, 2.0 dpt, 2.5 dpt, 3.0 dpt and 3.5 dpt, and a surface power of 5 dpt at the distance-vision reference point. This figure explains the inventively chosen dependence of the so-called error in alignment $x_0$ of the primary line, i.e. the error in alignment through which the primary line follows the "line of sight" when the eyes are dropped. More specifically, the primary line follows the point at which the line of sight passes through the progressive area, with eyes dropped.

Figure 4B:
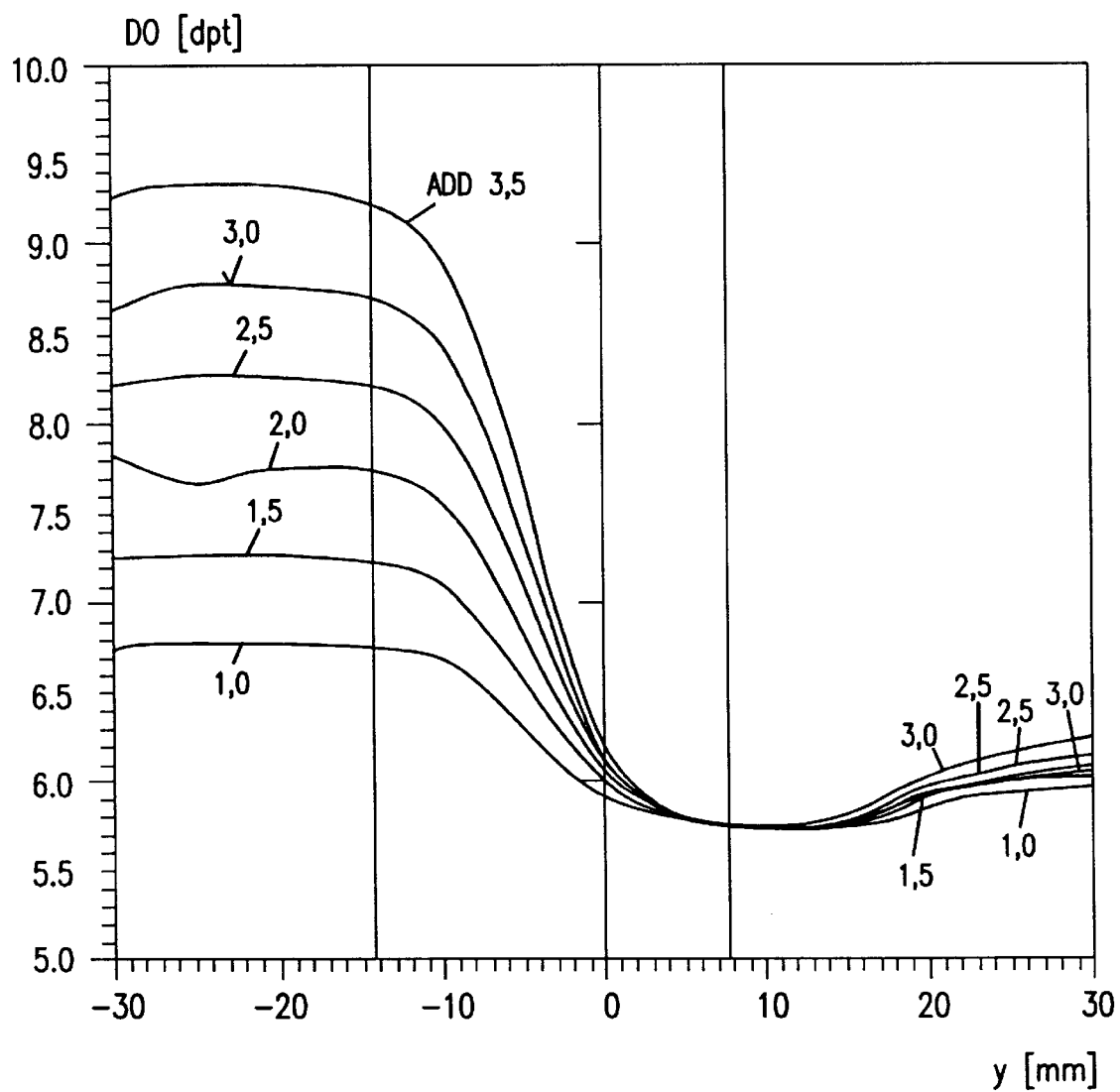
FIG. 4b represents the mean surface power for these primary lines.
Figure 4C:
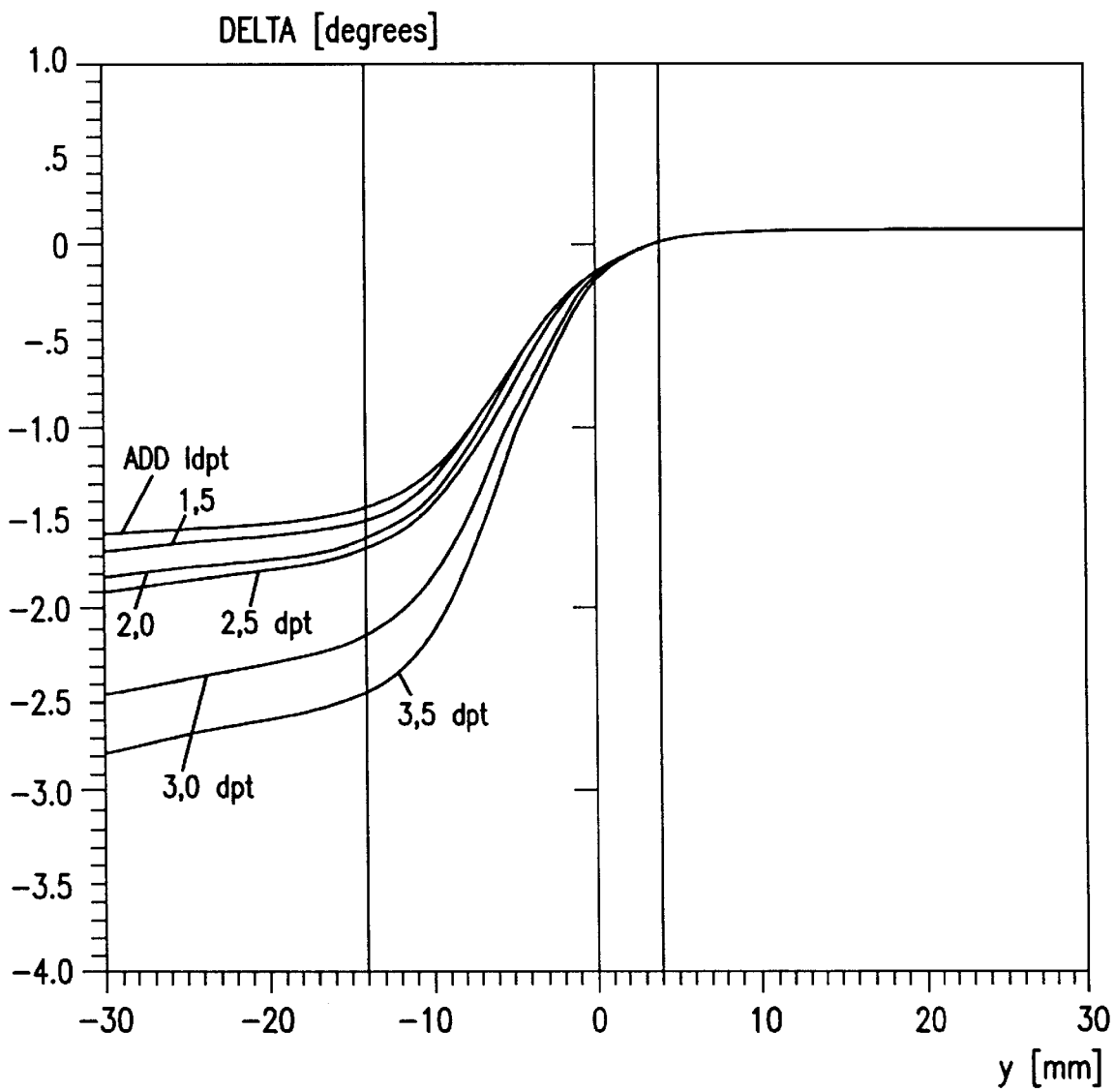
FIG. 4c gives the angle $\delta_0(y)$, i.e. the gradient of the horizontal sections at these primary lines.

FIGS. 4b and 4c show the mean surface power or the l'angle $\delta_0(y)$, respectively, i.e. the gradient of the horizontal sections at these primary lines for the primary lines plotted in FIG. 4a. Also with respect to FIG. 4, explicit reference is made to this illustration for the disclosure of all the details which are not described here in further details.

Figure 5:
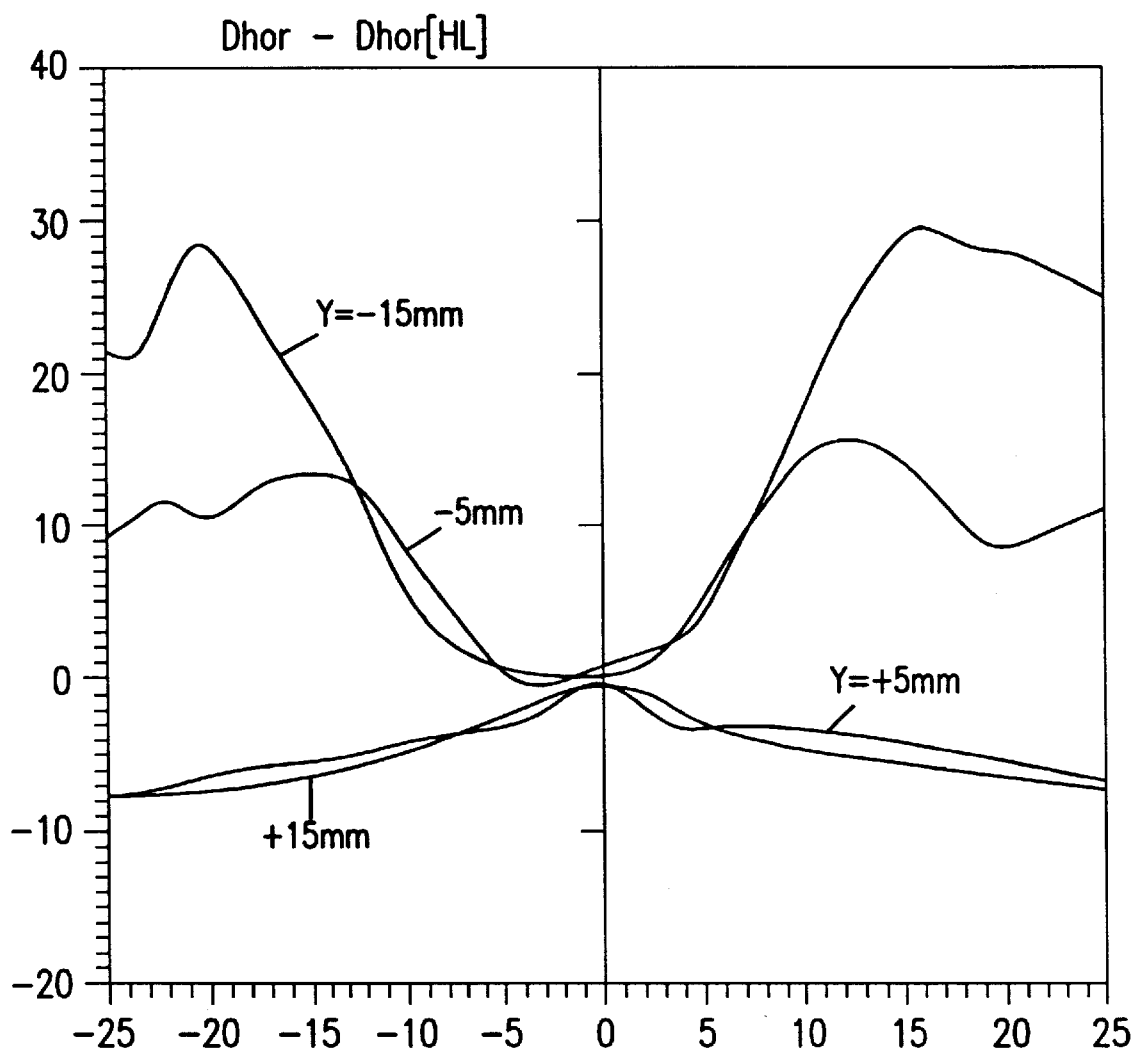
FIG. 5 shows the difference of the horizontal radii for a lens presenting the base graph 5 and the addition 2 for different values of y.

FIG. 5 shows the difference of horizontal radii for different values of y, specifically y=15 mm, 5 mm, −5 mm et −15 mm.

The term "horizontal radius" is to be understood here to denote the radius value obtained by the intersection of the progressive area with a horizontal plane y=const, i.e. in this example hence y=15 mm, 5 mm, −5 mm et −15 mm. The expression "difference of horizontal radii" should be understood here now to mean the difference between the horizontal radius on the primary line at point $x=x_0$, $y=y_0$, on the one hand, and the horizontal radius at a point $x_1$, $y=y_0$ of the progressive area, on the other hand. The respective point $x_0$ may be seen in FIG. 4a.

In the inventive surfaces, the difference of the horizontal radii varies, in each case, in the lower region of the distance-vision part, i.e. for y values from 5 to 10 mm in a strip on either side of the primary line, with a unilateral extension of roughly 3 to 8 mm, at a comparatively great gradient whereas the variation outside this strip presents a substantially smaller gradient. In the progression zone (y=−5 mm) and in the near-vision part (y=−15 mm), however, the gradient of the horizontal radius difference is comparatively small in this strip on both sides of the primary line. On the other hand, the difference of the horizontal radii varies in this zone with a very great gradient outside this strip, reaching a maximum at x=12 up to 20 mm, approximately. Subsequently to the "passage" through the maximum, the horizontal radius difference passes through a distinct minimum which migrates "to the outside" as the y values are reduced.

With such a gradient of the horizontal radius difference it is achieved that the lines of equal surface power do actually horizontally pass over into the primary line.

A similar graph of the horizontal radius difference is also achieved for other additions and base graphs so that an illustration for further additions and base graphs may be omitted.

The foregoing information enables the expert easily to calculate inventive areas in a form suitable for production, i.e. in the form of sagittae, for instance:

For an unambiguous description of a progressive area a function of the independent variables x and y is sufficient, e.g. the surface astigmatism Ast(x,y) and the knowledge of a first-order strip along the primary line. This first-order strip is unambiguously defined by three unidimensional functions. These functions may be the projection of the primary line in plane x,y (error in alignment $x_0(y)$), the projection of the primary line in plane y,z (error in alignment $z_0(y)$), the mean refraction H along the primary line, and the angle $\delta_0(y)$, i.e. the gradient of the horizontal sections at the primary line, for instance.

It is now possible to define, for example, the area by means of a performance function Z:

$$\text{minimum } Z = \int [(A(x,y) - A_v(x,y))^2 + (H(x_0(y),y) - H_v(y))^2 + ((x_0(y),y) - \delta_0(y))^2 \delta z/\delta x + z'_0(0)^2 + z_0(0))^2] \delta x dy$$

In the foregoing the index v signifies that a specified value is involved. Moreover, the starting values $z_0 = z'_0 = 0$ must be given for y=0 to $z'_0 = \delta z/\delta y$. $H_v$ is the mean surface power on the primary line.

As has been mentioned in the foregoing, it is possible that within the inventive series of lenses, in the event of a prescription of spherical surfaces, the concave side face may be a non-spherical surface, while in the event that toroidal surfaces are prescribed it may be a non-toroidal surface, with the base line of the progressive surface being chosen to present a "flattening" by 1 dpt to 1.5 dpt, relative to the spherical or toroidal surface on the concave side.

The "aberrations", which are created by the "flattened base graph" in wearing position are corrected by the aspherical or non-toroidal surface, respectively.

FIG. 6 shows the deviations, in μm, of a non-toroidal surface which is required for correcting, in the aforementioned manner, the aberrations of a spherical surface which "fits snugly" to the non-toroidal surface at the apex point, thus having circular principal sections intersecting with a radius that corresponds to the apex radius of aspherical principal sections of the non-toroidal surface.

All the non-toroidal surfaces illustrated in the figures are calculated for lenses having a refractive index of 1.604.

Figure 6A:
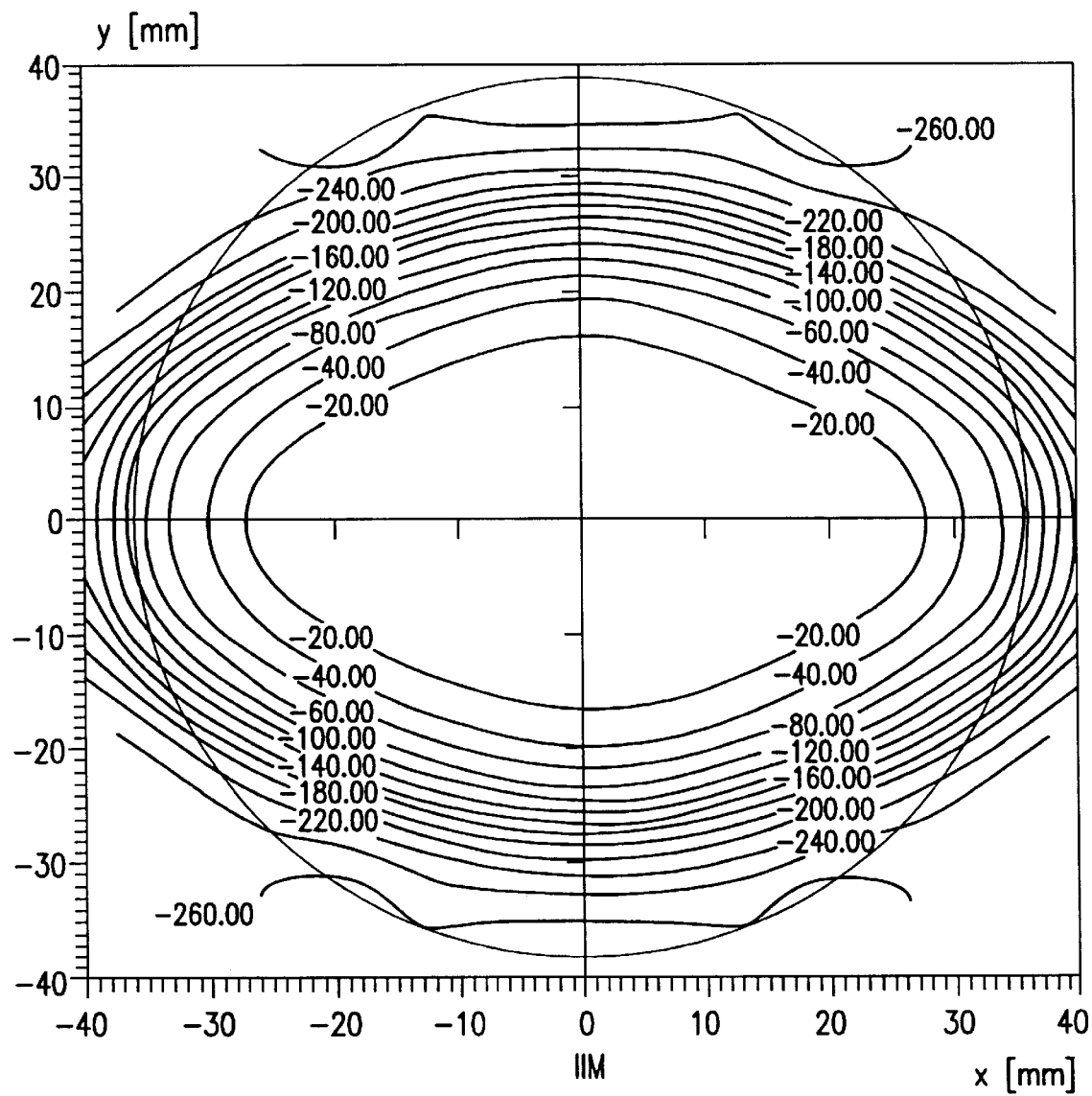
FIGS. 6a to 6d represent the deviations of corresponding toroidal surfaces from non-toroidal surfaces.
Figure 6B:
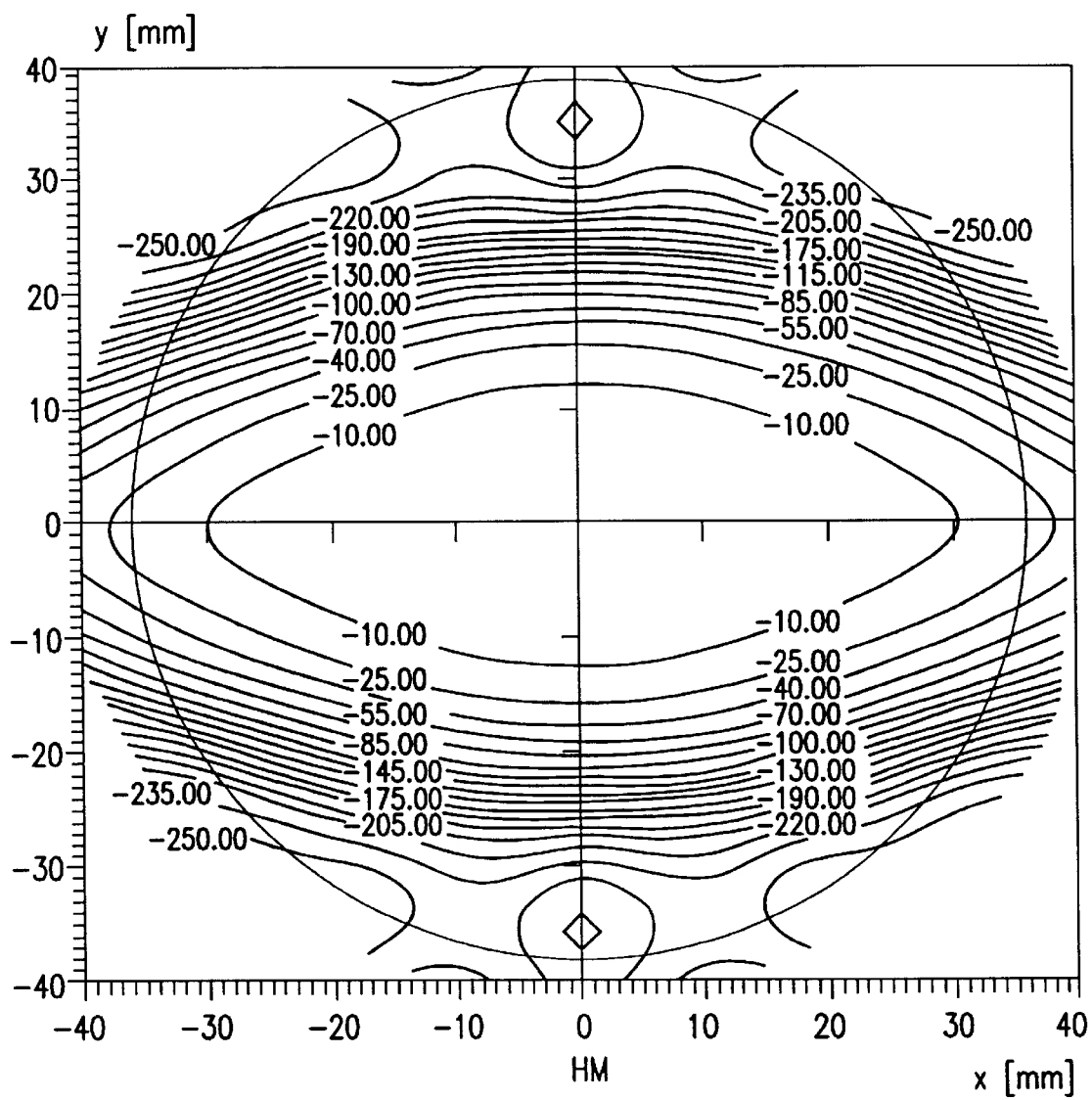
Figure 6C:
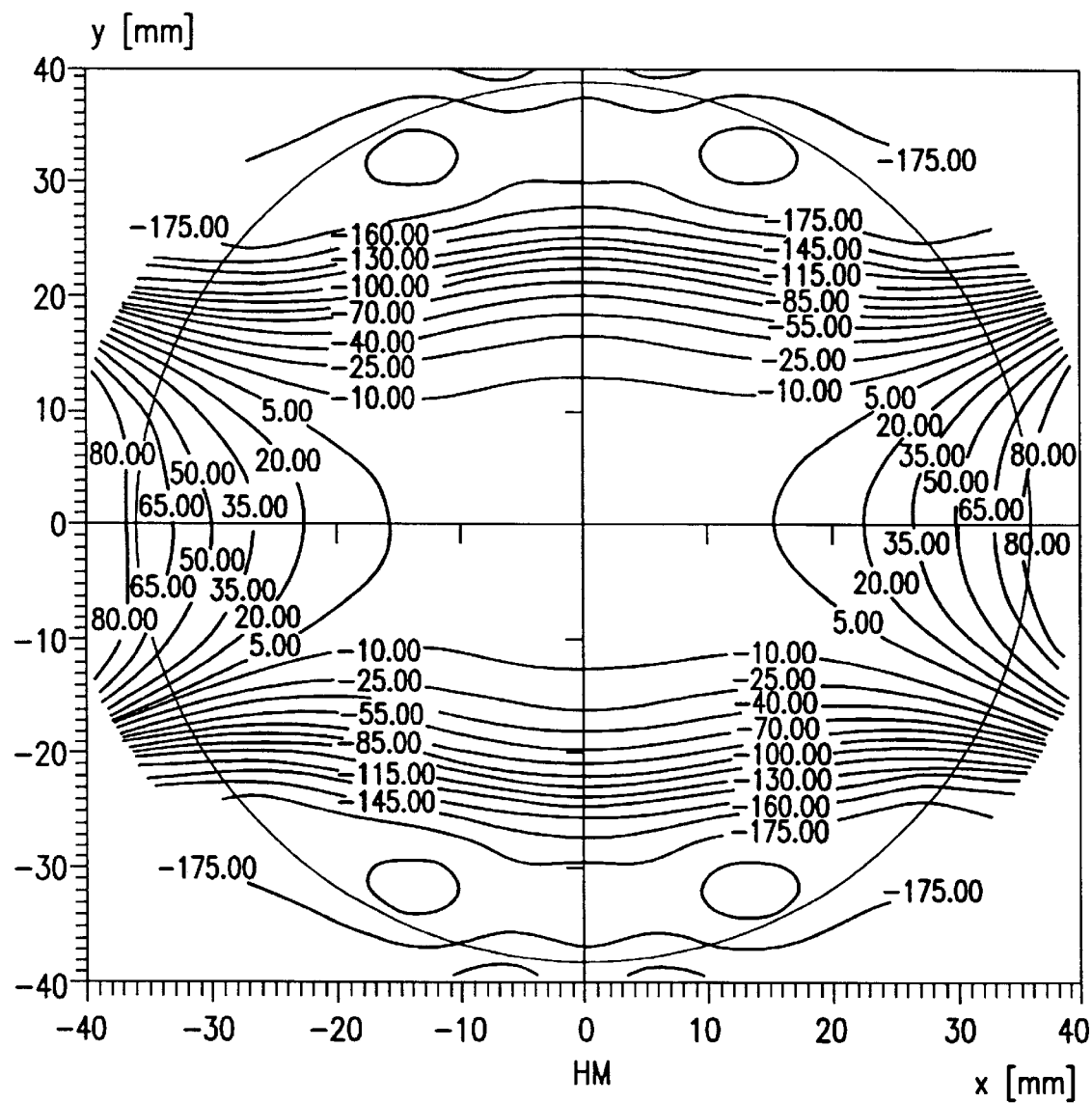
Figure 6D:
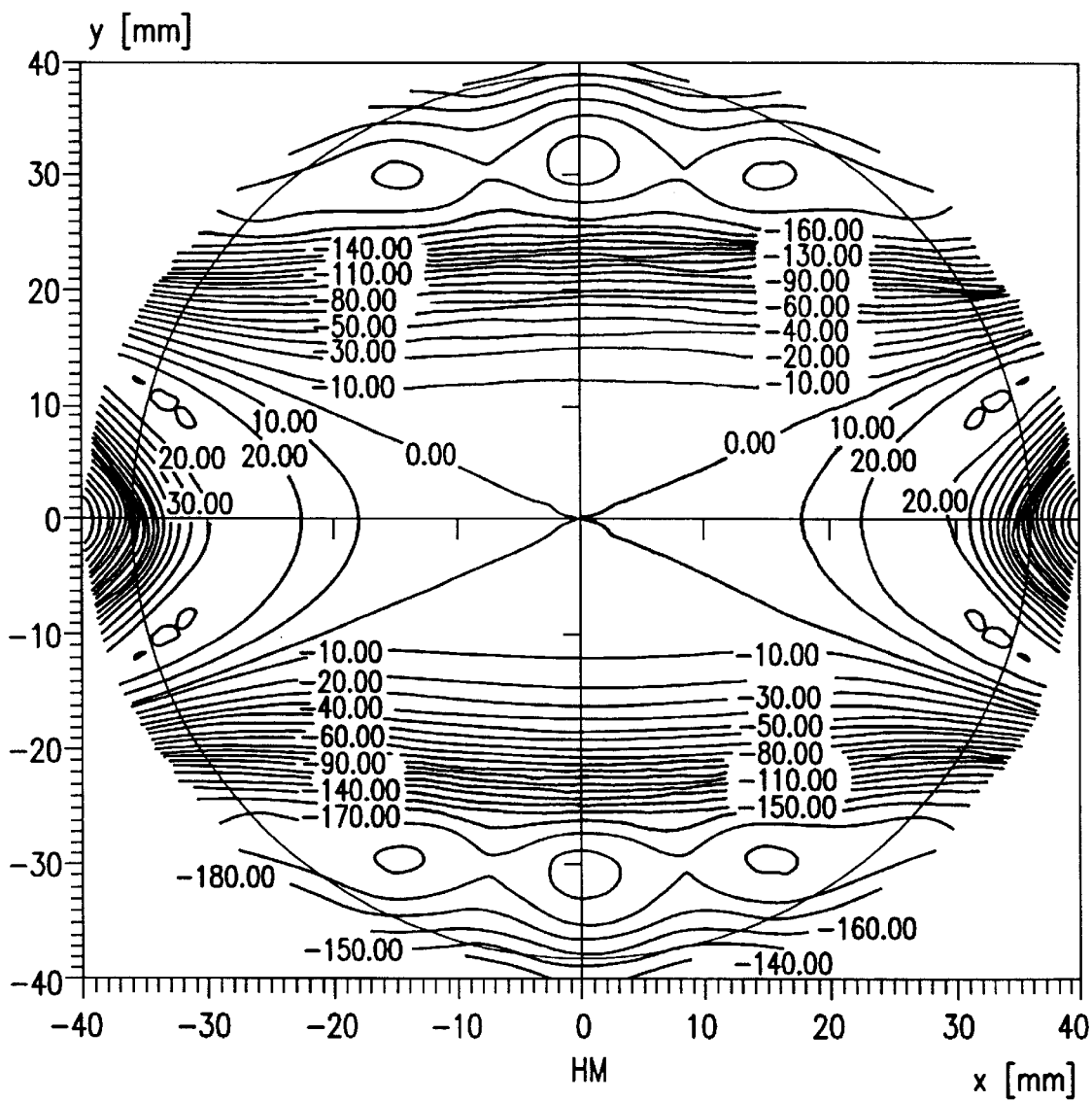

|  | spherical effect | negat. cylinder | axial posit. |
|---|---|---|---|
| FIG. 6a | −4.0 dpt. | +2.25 dpt. | 30° |
| FIG. 6b | −4.0 dpt. | +2.25 dpt. | 80° |
| FIG. 6c | −4.0 dpt. | +2.25 dpt. | 110° |
| FIG. 6d | −4.0 dpt. | +2.25 dpt. | 150° |

The data refers to the respective principal sections of non-toroidal surfaces. The dependence on the axial position is here not as important as the dependence on the spherical effect (effect of the "stronger" principal section) and on the negative cylinder (difference in terms of effect between the stronger principal section and the weaker principal section), with the latter dependence being established in accordance with the present invention.

Figure 7A:
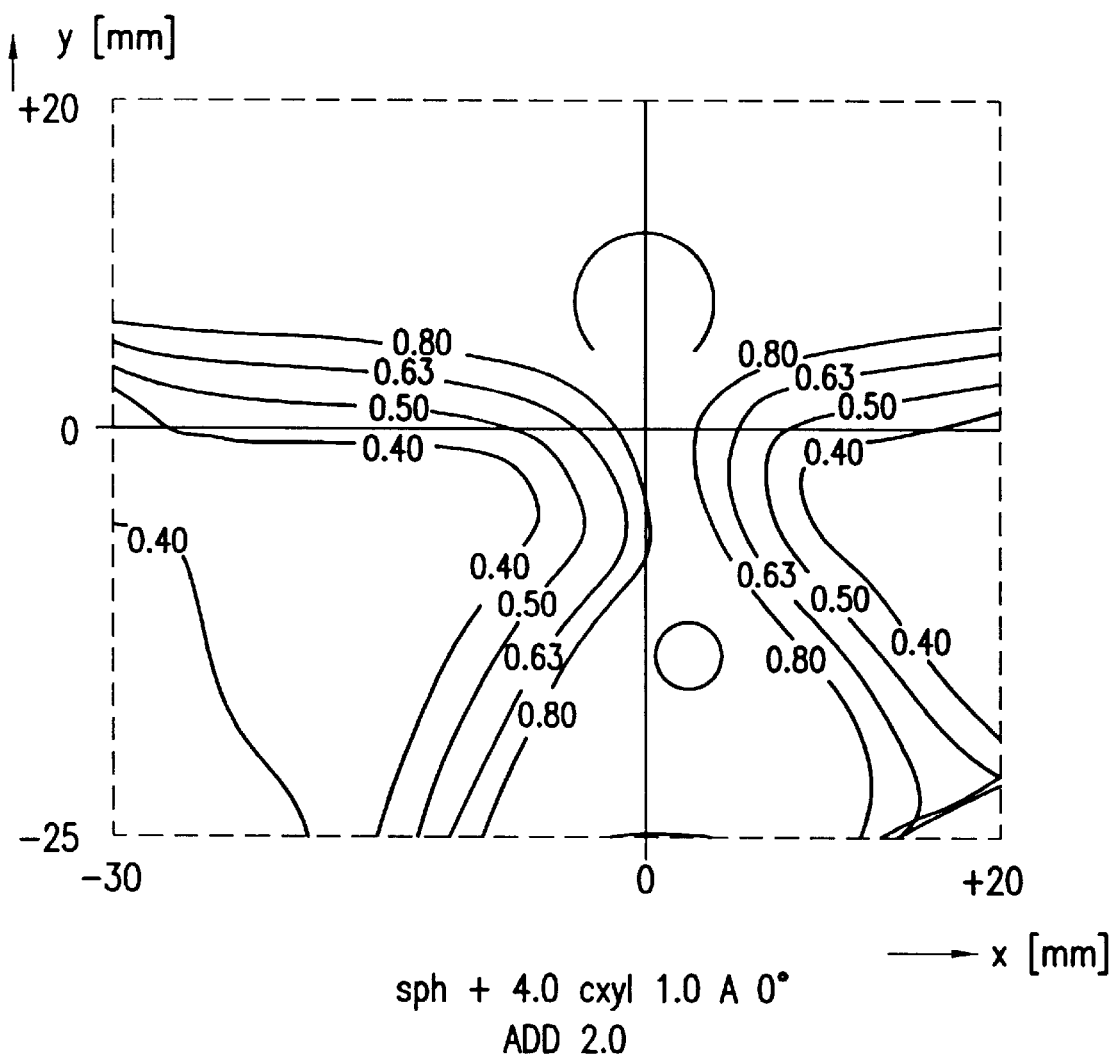
FIGS. 7a to 7b illustrate the lines of visual iso-acuity for a progressive lens having a non-toroidal surface on the concave side or a toroidal surface, respectively, on the concave side.
Figure 7B:
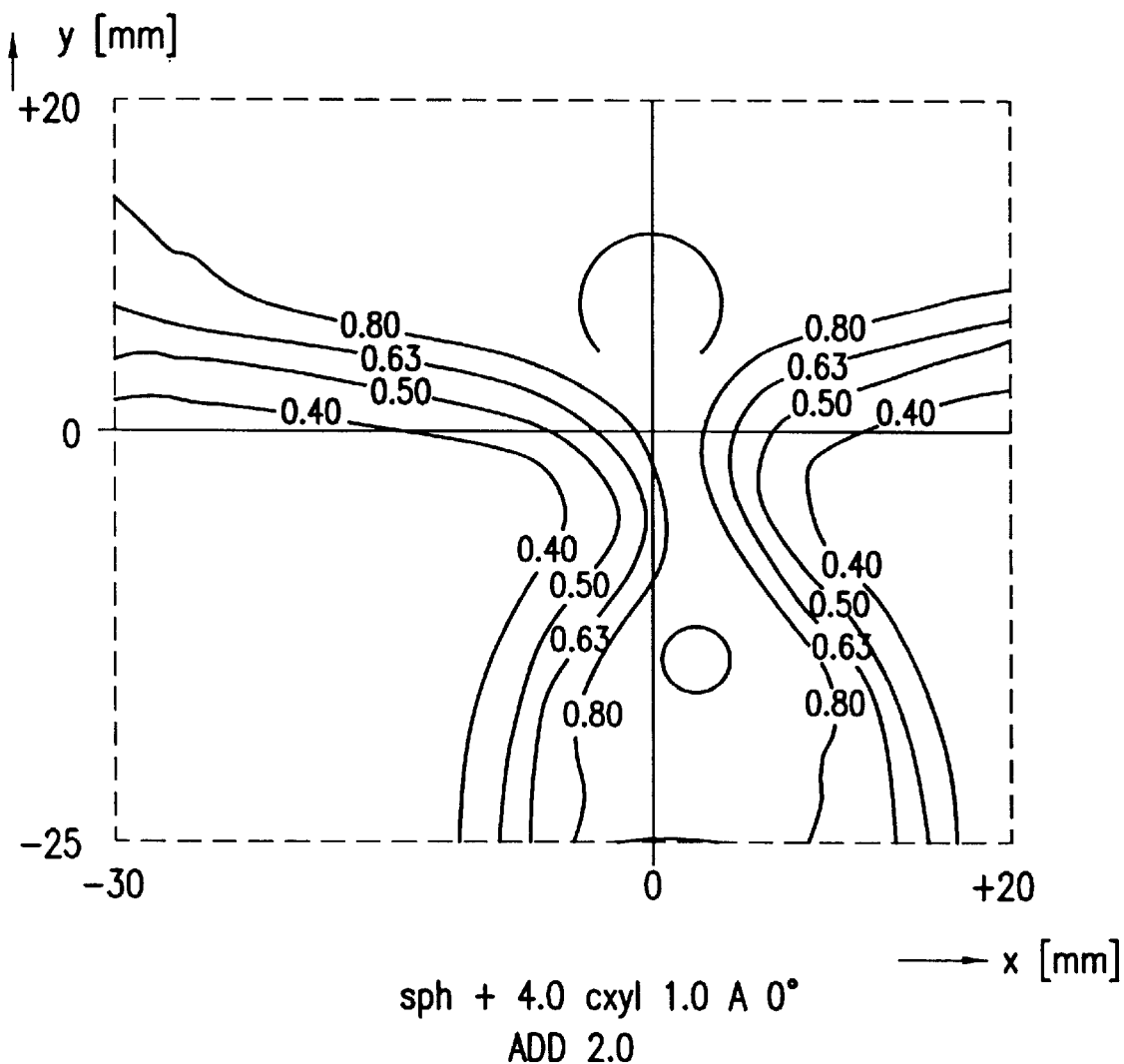

FIGS. 7a and 7b show the lines of visual iso-acuity for a progressive lens having a non-toroidal surface on the concave side (7a) and a toroidal surface on the concave side (7b).

In the two lenses the distance-vision part has an effect of 4 dpt, an addition of 2 dpt and a cylinder of 1 dpt. The axial position is 0°. The base graph of the lens shown in FIG. 1a, however, is "flattened" by 1.5 dpt. It is clearly visible here that with the same optical performance the progressive lens with a non-toroidal face on the concave side is more expedient from a cosmetic point of view.

In conclusion it may be established that the difference in sagitta is defined by a function according to claim 15 for each principal section and for each combination of the spherical effect and the "cylinder". The parameters a and b are, however, in linear dependence on the value of the cylinder, whilst the coefficient defining the gradient is a linear function of the spherical effect. The coefficient which furnishes the intersection of the straight line with the ordinate constitutes a second-order function of the spherical effect. It is hence possible to define the difference in terms of sagitta by means of 20 parameters for each principal section.

The present invention has so far been described by way of embodiments, without any restriction of the general inventive idea which derives from the Patent Claims. In particular, it is possible to employ the aforedescribed non-toroidal surfaces also in combination(s) with progressive surfaces having a different structure.

We claim:

1. Series of progressive lenses, wherein the individual lenses of the series present, in a distance-vision part, at least one of a different surface power and a different increase of the surface power from the distance-vision part towards a near-vision part, with each of the lenses comprising a front surface having a continuously varying surface power increasing from the respective value BK suitable for distance vision, at the point having the coordinates x=0 mm, y=8 mm in the lower region of the distance-vision part along a wound line (primary line), which is approximately coincident with the primary line of vision, with eyes dropped, towards a value suitable for near vision in the upper region of the near-vision part, which value is greater than the value of the surface power BK in the lower region of the distance-vision part by the value Add of the addition, and presenting a surface, in particular the surface on the concave side, which has a spherical shape or aspherical shape, respectively, wherein for the maximum height y of the line on which the surface astigmatism is 0.5 dpt and which defines the lower limit of the region clear vision on either side of the primary line at a distance of 25 mm, applies:

$y = f(\text{Add}, BK) = b(BK) + a/\text{Add}*1000)$ $b(BK) = a_0 + a_1*BK + a_2*BK^2$ and that for the coefficients on the nose and temporal sides of the primary line applies:

|  | nose side |  | temporal side |  |
|---|---|---|---|---|
| a | −8.5 ± 20% |  | −7.5 ± 20% |  |
| $a_0$ | 18...19 | mm | 19...20 |  |
| $a_1$ | −3580 ± 29% | mm² | −4520 ± 20% | mm² |
| $a_2$ | 3900 000 ± 20% | mm³ | 480 000 ± 20% | mm³. |

2. Series according to claim 1, wherein the tolerances for the coefficients a, $a_1$ and $a_2$ are ±5%.

3. Series according to claim 1, wherein the coefficient $a_0$ on the nose side presents a value of 18 mm and a value of 10.3 mm on the temporal side.

4. Series according to claim 1, wherein the maximum width dx of said near-vision part merely is a function of the addition Add.

5. Series according to claim 4, wherein for the width dx of said near-vision part, at the level of the near-vision reference point, applies:

$dx = b' + a'/(\text{Add}*1000)$ with a'=14.6±20% b'=5 ... 7 mm.

6. Series according to claim 4, wherein the tolerance for the coefficient a' is ±5%, and that the coefficient b' has a value of 6 mm.

7. Series according to claim 1 wherein for the error in alignement $x_0$ of the projection of the primary line in plane x, y applies:

$$x_0 = b'' + a'' - a''/(1+e^{c*(y+d)})$$

and that for the coefficients applies:

$$2 \leq a'' \leq 4.3 \text{ mm}$$

$$-0.03 \leq b'' \leq 0 \text{ mm}$$

$$-0.4 \leq c \leq -0.3 \text{ mm}^{-1}$$

$$4.5 \leq d \leq 5.1 \text{ mm.}$$

8. Series according to claim 7, wherein the coefficient a" is a function of the addition Add and of the surface power BK of the near-vision part.

9. Series according to claim 8, wherein the following applies:

$$a'' = \alpha*ADD + \beta*BK + \Gamma$$

wherein applies for the coefficients:

$$100 \leq \beta \leq 300 \text{ mm}^2$$

for Add≦2.5 dpt:

$$0 \leq \alpha \leq 200 \text{ mm}^2$$

$$1.3 \leq \Gamma \leq 2 \text{ mm}$$

for Add>2.5 dpt:

$$800 \leq \alpha \leq 1100 \text{ mm}^2$$

$$0.7 \leq \Gamma \leq 0 \text{ mm.}$$

10. Series according to claim 1, wherein the surface astigmatism on the primary line is zero at least for −18 mm<y≦12 mm.

11. Series according to claim 1, wherein the lines of equal surface power enter into the primary line horizontally.

12. Series according to claim 1, wherein the face on the concave side is, in the event of a spherical prescription, an aspherical surface, and in the case of a toroidal prescription a non-toroidal surface, and in that the base line of the progressive faces is chosen to be "flatter" by 1 dpt to 1.5 dpt than in the case of a spherical or toroidal face, respectively, on the concave side.

13. Series according to claim 12, wherein the design of said non-toroidal surface varies as a function of the axial position of the cylinder.

14. Series according to claim 12, wherein said non-toroidal surface comprises at least a principal section which deviates from the circular shape.

15. Series according to claim 14, wherein the deviation dz between the sagitta of said section, which deviates from the circular shape, and a circle having a radius corresponding to the apex radius of the non-sphere, is defined by:

$$dz = a_j*r^2 + b_j*r^4$$

wherein:

dz is the deviation (in $\mu$m) between the apex circle and the principal section, r means the distance from the apex (in mm), and that for the coefficients $a_{j2}$ and $b_{j2}$ applies:

$$|a_j| \leq 2*10^{-4} \text{ mm}^{-1}$$

$$|b_j| \leq 1*10^{-6} \text{ mm}^{-3}$$

with the principal section having the smaller apex curvature being defined by j=1, and with the section having the greater apex curvature being defined by j=2.

16. Series according to claim 15, wherein the coefficients $a_j$ and $b_j$ are defined by the following functional relationships:

$$a_j = f_{j1}(s,z) = a_{j1}(s) + b_{j1}(s)*\text{cyl}$$

$$b_j = f_{j2}(s,z) = a_{j2}(s) + b_{j2}(s)*\text{cyl}$$

wherein:

s denotes the spherical effect at the distance-vision reference point, in negative cylinder notation, cyl indicates the cylindrical effect at the distance-vision reference point, in negative cylinder notation, and each of the coefficients $a_{j2}$ and $b_{j2}$ is a second-order function of s.

17. Series according to claim 16, wherein for the coefficients $a_{j1}$ and $b_{j1}$ applies:

$$|a_{j1}| \leq 5*10^{-5} \text{ mm}^{-1}$$

$$|b_{j1}| \leq 5*10^{-2}$$

$$|a_{j2}| \leq 4*10^{-7} \text{ mm}^{-3}$$

$$|b_{j2}| \leq 3*10^{-4} \text{ mm}^{-2}.$$

18. Series according to claim 16, wherein the coefficients $a_{j2}$ and $b_{j2}$ are defined by the following functional relationships:

$$a_{j2} = a_{j21} + b_{j21}*s + c_{j21}*s^2$$

$$b_{j2} = a_{j22} + b_{j22}*s + c_{j22}*s^2.$$

19. Series according to claim 18, wherein for the coefficients a, b and c applies:

$$a_{j21} = 2.35*10_{-8} \text{ mm}^{-3} \pm 50\%$$

$$b_{j21} = -1.7*10_{-5} \text{ mm}^{-2} \pm 50\%$$

$$c_{j21} = -8*10_{-8} \text{ mm}^{-1} \pm 50\%.$$

20. Series according to claim 18, wherein for the coefficients of the two principal sections applies:

$$a_{121} = 2.35*10_{-8} \text{ mm}^{-3} \pm 50\%$$

$$b_{121} = -1.7*10_{-5} \text{ mm}^{-2} \pm 50\%$$

$$c_{121} = -8*10_{-8} \text{ mm}^{-1} \pm 50\%$$

$$a_{122} = 1.73*10_{-5} \text{ mm}^{-2} \pm 50\%$$

$$b_{122} = 3.22*10_{-2} \text{ mm}^{-1} \pm 50\%$$

$$c_{122} = -2.27 \pm 50\%$$

$$a_{222} = -2.76*10_{-5} \text{ mm}^{-2} \pm 50\%$$

$$b_{222} = -1.29*10_{-3} \text{ mm}^{-1} \pm 50\%$$

$$c_{222} = -0.172 \pm 50\%.$$

* * * * *